United States Patent [19]

Nakano et al.

[11] 4,076,646

[45] Feb. 28, 1978

[54] LIQUID CRYSTAL COMPOSITION FOR FIELD EFFECT DISPLAY DEVICES

[75] Inventors: Fumio Nakano; Hisao Yokokura; Kenji Murao, all of Hitachi, Japan

[73] Assignee: Hitachi, Ltd., Japan

[21] Appl. No.: 721,410

[22] Filed: Sep. 8, 1976

[30] Foreign Application Priority Data

Sep. 12, 1975 Japan ............................... 50-110105

[51] Int. Cl.$^2$ ........................... C09K 3/34; G02F 1/13

[52] U.S. Cl. .................................... 252/299; 252/408; 350/350

[58] Field of Search ............................... 252/299, 408; 350/160 LC

[56] References Cited

U.S. PATENT DOCUMENTS

| | | | |
|---|---|---|---|
| 3,815,972 | 6/1974 | Hsieh | 252/299 |
| 3,947,375 | 3/1976 | Gray et al. | 252/299 |
| 3,960,749 | 6/1976 | Fergason | 252/299 |
| 3,975,286 | 8/1976 | Oh | 252/299 |
| 3,977,768 | 8/1976 | Nakamura et al. | 252/299 |
| 3,981,558 | 9/1976 | Oh et al. | 252/299 |
| 3,983,049 | 9/1976 | Aftergut et al. | 252/299 |
| 3,988,054 | 10/1976 | Yaguchi et al. | 252/299 |

FOREIGN PATENT DOCUMENTS

| | | | |
|---|---|---|---|
| 2,502,904 | 7/1975 | Germany | 252/299 |
| 2,321,632 | 11/1974 | Germany | 252/299 |
| 4,938,888 | 4/1974 | Japan | 252/299 |
| 4,962,390 | 6/1974 | Japan | 252/299 |

*Primary Examiner*—Leland A. Sebastian
*Assistant Examiner*—T. S. Gron
*Attorney, Agent, or Firm*—Craig & Antonelli

[57] ABSTRACT

A liquid crystal composition for field effect display devices, comprising a nematic liquid crystal composition having a substantially positive dielectric anisotropy and at least one of o-terphenyl and m-terphenyl. This composition sufficiently functions at 2 V, because the threshold voltage of the liquid crystal composition can be made about 1.5 V.

7 Claims, 1 Drawing Figure

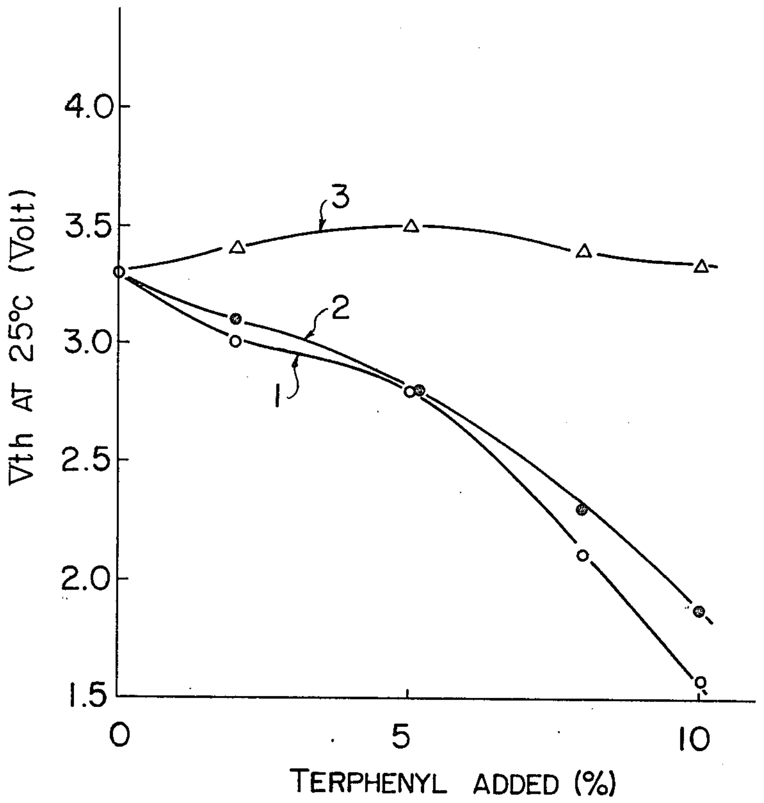
4.0
3.5
3.0
2.5
2.0
1.5
Vth AT 25°C (Volt)
0
5
10
TERPHENYL ADDED (%)
1
2
3

LIQUID CRYSTAL COMPOSITION FOR FIELD EFFECT DISPLAY DEVICES

This invention relates to a nematic liquid crystal composition containing at least one of o-terphenyl and m-terphenyl and having a positive dielectric anisotropy especially for field effect display devices. The present liquid crystal composition can provide a threshold voltage as low as about 1.5 V in the field effect display system and thus can sufficiently function at 2 V.

Heretofore, various systems have been proposed for field effect display devices using nematic liquid crystals, and one of the practical systems among them is a display device using a liquid crystal cell having a structure in which the long axes of liquid crystal molecules are oriented in parallel in one definite direction in a layer between the surfaces of two base plates, and the directions of orientation of the layer between these two base plates are made to be twisted by 90° to continuously twist the directions of orientation of the liquid crystal layer between the base plates (the device will be hereinafter referred to as TN (twist nematic) display). This system can be driven at the lowest voltage among the liquid crystal display devices, and thus is suitable as a display device especially for a wrist watch. Furthermore, even in electric cell-driven display devices in industrial instruments and table computors, a low voltage driving is in great demand.

To meet this demand, research has been made on how to lower the threshold voltage (which will be hereinafter referred to as Vth) of the nematic liquid crystal to be used in a TN display device to lower the driving voltage. To lower the Vth, efforts have been made to increase the dielectric anisotropy of the liquid crystal:

$$\Delta\epsilon = \epsilon_{\parallel} - \epsilon_{\perp} \quad (1)$$

wherein $\epsilon_{\parallel}$ represents a dielectric constant in a parallel direction to the long axes of the liquid crystal molecules, and $\epsilon_{\perp}$ a dielectric constant in a direction perpendicular to the long axes of the liquid crystal molecules. For example, Schadt et al synthesized liquid crystal compounds having very high dielectric anisotropy and a structure represented by the following formula:

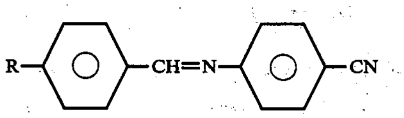

wherein R is $C_3H_7$ or $C_6H_{13}$ A. Boller, H. Scherrer, M. Schadt: Proc. IEEE, vol. 60, page 1002 (1972). The compounds have a Vth of about 1.5 V, and thus can work at about 2 V. However, the compounds are liable to undergo hydrolysis of the azomethine bond owing to the introduction of the CN group which imparts a very high polarity into the compounds. Therefore, a great precaution must be paid to their handling, and complete air tightness by a hermetic seal is required for the display device.

Other attempts have been also made to obtain compounds having a high dielectric anisotropy and high stability. For example, Gray et al synthesized liquid crystal compounds of a biphenyl type having a structure represented by the formula:

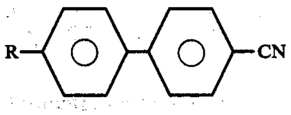

wherein R represents an alkyl or alkoxy group (G. W. Gray, K. J. Harrison, J. A. Nash: Electron Letters 9 130 (1973)). However, compositions showing a liquid crystal phase are hardly obtained in a wide range of temperatures including room temperature in the case of said compounds, even by applying an eutectic effect of mixing a plurality of components as usually employed. That is, the compounds are not always satisfactory in some applications.

An object of the present invention is to provide a nematic liquid crystal composition having a good chemical stability and a low threshold voltage.

Another object of the present invention is to provide a liquid crystal composition suitable for field effect display devices workable at a low voltage, especially for a TN display system.

Other objects of the present invention are comprehensible from the description which follows.

The accompanying drawing is a graph showing relations between the amount of terphenyl added in the liquid crystal composition of the present invention and Vth.

The present inventors have studied an art to lower a Vth of liquid crystals from other viewpoints than the conventional ones based on the dielectric anisotropy, and have found that a nematic liquid crystal composition containing at least one of o-terphenyl and m-terphenyl and having a positive dielectric anisotropy has a low threshold voltage and is suitable for attaining the objects of the present invention.

These compounds, i.e. o-terphenyl and m-terphenyl are represented, respectively, by the following formulae:

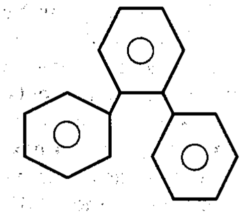

and

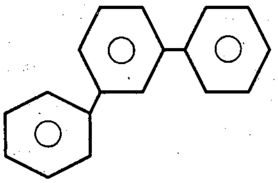

The function and mechanism of o-terphenyl or m-terphenyl in the present liquid crystal composition have not been clarified yet, but it is very characteristic that, among the terphenyl isomers, p-terphenyl having the linear structure fails to lower the Vth. Since o-terphenyl and m-terphenyl have the bent molecular structures, it seems that they can take places between the molecules of liquid crystal compounds, and weaken mutual actions of the molecules of the liquid crystal compounds and lower the Vth.

Furthermore, o-terphenyl and m-terphenyl have no polar groups at all, and thus by no means react with the polar groups of the liquid crystals, which makes o-terphenyl and m-terphenyl effective upon various liquid crystal compounds. That is, Vth can be further lowered by mixing at least one of them into a composition consisting of

 and 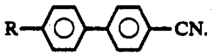

Furthermore, it is considerably effective to mix at least one of them into a nematic liquid crystal composition which has been so far neglected because of its high Vth. For example, when a liquid crystal having a negative dielectric anisotropy is mixed with a liquid crystal compound having a positive dielectric anisotropy, or a compound having a large dipole moment in the direction of long axis of molecule, though the latter is not a liquid crystal, the dielectric anisotropy can be made positive. Nematic liquid crystal compositions having a nematic liquid crystal phase in a wide temperature range including at room temperature can be readily obtained from the liquid crystals having the negative dielectric anisotropy, but the positive dielectric anisotropy of the liquid crystal composition cannot be made large enough according to said procedure. The present invention is, however, very effective upon such liquid compositions, because the present invention can lower the Vth of such liquid crystal compositions.

The nematic liquid compositions having a negative dielectric anisotropy and a wide mesomorphic range around room temperature (the mesomorphic range will be hereinafter referred to as MR) include, for example, a first mixture consisting of equal parts by weight of p-methoxybenzylidene-p-butylaniline, p-ethoxybenzylidene-p-butylaniline, and p-ethoxybenzylidene-p-heptylaniline (MR: −27 to +69.5° C), a mixture consisting of 100 parts by weight of said first mixture of the equal parts by weight and 30 parts by weight of a compound represented by:

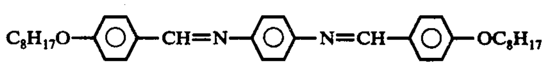

(MR: −24° to 95.5° C), a mixture consisting of 100 parts by weight of said first mixture of the equal parts by weight, and 10 parts by weight of 4,4'-bis(hexyloxy)azoxybenzene (MR: −26° to +62° C), and an eutectic mixture consisting of the following six components, 4-methoxy-4'-butylazoxybenzene, 4-butyl-4'-methoxyazoxybenzene, 4-ethoxy-4'-hexylazoxybenzene, 4-hexyl-4'-ethoxyazoxybenzene, 4-methoxy-4'-hexylazoxybenzene, and 4-hexyl-4'-methoxyazoxybenzene (MR: −35° to +83.5° C).

The liquid compounds to be used for making the dielectric anisotropy positive include, for example, said p-alkylbenzylidene-p'-cyanoaniline, such as

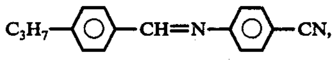

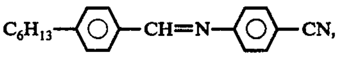 etc., p-alkyl- or p-alkoxy-p'-cyanobiphenyl, such as

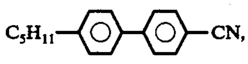 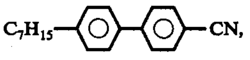

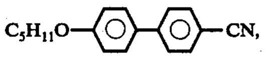 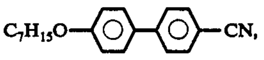

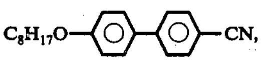 etc., p-alkoxybenzylidene-p'-

-continued cyanoaniline, such as 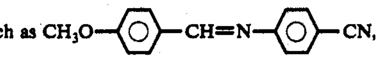

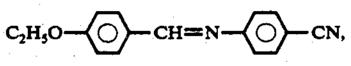

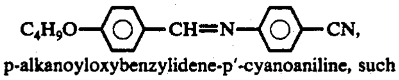

etc., p-alkanoyloxybenzylidene-p'-cyanoaniline, such as

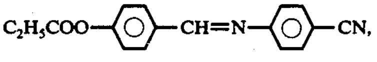

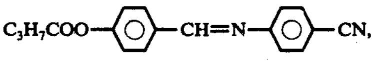

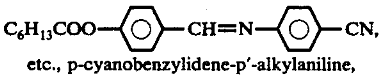

etc., p-cyanobenzylidene-p'-alkylaniline, such as 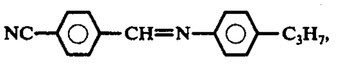

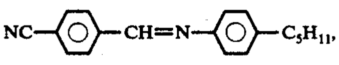 etc., 4,4'-bis(alkyl)- azoxybenzene such as 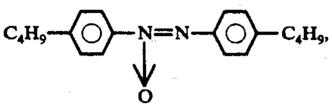

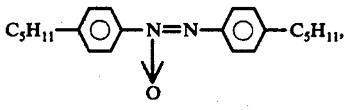

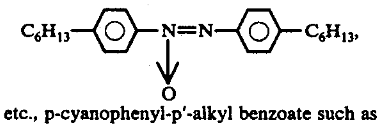

etc., p-cyanophenyl-p'-alkyl benzoate such as

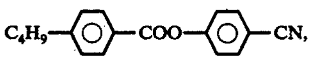

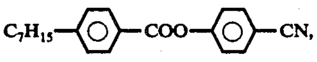 etc.

The liquid crystal-anologous compounds having a larger dipole moment in the direction of long axis of molecule include p-cyanobenzylideneaminobenzene, on composition. p-nitrobenzylideneaminobenzene, and p-nitrobenzylidene-p'-alkylaniline, such as

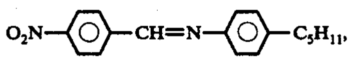

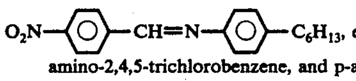 etc., p-nitrobenzylidene-amino-2,4,5-trichlorobenzene, and p-alkoxybenzylidene-p'-chloroaniline, such as 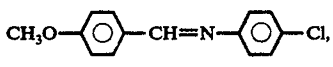

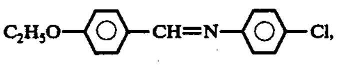 etc., p-alkylcyanobenzene, such as 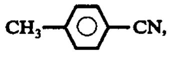 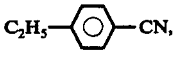 etc., and p-N-dialkylcyanoaniline such as 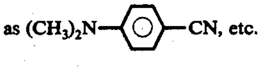 etc.

It is preferable to add 5 to 15% by weight of the compound capable of making the dielectric anisotropy positive to the nematic liquid crystal composition composition. the basis of the composition. In the case of more than 15% by weight, the liquid crystal compound of such type as represented by

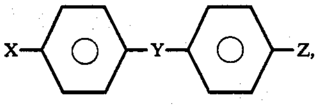

and the liquid crystal analogous compound will turn to smectic liquid crystals, and the low molecular weight compounds of such type as represented by

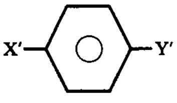

will have an extremely narrow MR. In the case of less than 5% by weight, the dielectric anisotropy will not be made large enough, and Vth will be unpreferably larger. At least two of these compounds can be used together at the same time.

The present invention composition can be obtained by adding at least one of o-terphenyl and m-terphenyl to said nematic liquid crystal composition having a substantially positive dielectric anisotropy. It is preferable to add 2 to 10 parts by weight of the terphenyl to 100 parts by weight of the liquid crystal composition. By adding 8 parts by weight of terphenyl to 100 parts by weight of the liquid crystal composition, the initial Vth can be 70 - 80% lowered, though dependent upon the kind of the liquid crystals.

The larger amount of the terphenyl added, the lower the Vth, but it is not preferable to add too large an amount of the terphenyl to the liquid crystal composition, because other characteristics such MR, etc. are sometimes adversely influenced thereby. It is necessary to pay an attention especially to the addition of more than 10 parts by weight of the terphenyl, because the range of MR will be narrowed, depending upon the kind of the liquid crystals.

Now, the present invention will be described, referring to Examples.

EXAMPLE 1

0.3 g of p-nitrobenzylideneaminobenzene was added to 3 g of a mixture consisting of equal parts by weight of p-methoxybenzylidene-p'-butylaniline (which will be hereinafter referred to as MBBA), p-ethoxybenzylidene-p'-butylaniline (which will be hereinafter referred to as EBBA), and p-ethoxybenzylidene-p'-heptylaniline (which will be hereinafter referred to as EBHpA), and the resulting mixture was heated at about 80° C for 2 hours to obtain a uniform liquid crystal composition (A).

A nesa electrode of indium oxide was formed on a glass base plate having a thickness of 3 mm, and two base plates coated with a fluorine-based surfactant (FX-161, product of 3-M Corporation, USA) were arranged in a face-to-face position above the electrode plate, while making an electrode clearance 12 μm and sealing the peripheral parts with an epoxy resin-based adhesive. Capacitor at 25° C of the resulting cell was measured by means of a capacitance bridge by applying a potential of 10 kHz, 1 V thereto. Then, said liquid crystal composition (A) was filled into the cell, which was then sealed, and whose capacitor was measured. Dielectric constant of the liquid crystal composition was determined from their ratio. In that case, the long axes of liquid crystal molecules are oriented in the direction perpendicular to the faces of the base plates (homeotropic orientation, and thus its dielectric constant shall be $\epsilon_{\perp}$.

Then, to make the long axes of liquid crystal molecules orient in parallel to the faces of the base plates (homogenial orientation) in contrast to the above, two base plates vapor deposited with SiO at an angle of 80° inclined to the normal direction to the electrode base plate after the formation of nesa electrode were arranged in a face-to-face position above the electrode base plate to form a cell of the same dimensions as above (for the inclined vapor deposition of SiO, see Japanese Laid-open Patent Application No. 17746/74; U.S. patent application Ser. No. 242,675) (Apr. 10, 1972) now abandoned, J. L. Janning: Applied Physics Latters, Vol. 21 (4) page 173 - 174 (1972).

Then, said liquid composition (A) was filled into the resulting cell, which was sealed, and dielectric constant $\epsilon_{\parallel}$ was likewise determined for the case where the long axes of liquid crystal molecules were oriented in parallel to the face of the electrode base plate.

Furthermore, the cell with SiO vapor deposited at the inclined angle was arranged between two polarizing plates whose polarizing directions were crossed with each other at a right angle, and a 500 Hz AC rectangular wave potential was applied thereto to measure Vth. The liquid crystal composition (A) had 3.3 V. From said equation (1), the dielectric anisotropy $\Delta\epsilon$ of the liquid crystal was found 2.5.

By adding 2.5 and 8 parts by weight of o-terphenyl each to 100 parts by weight of said liquid crystal composition (A), three liquid crystal compositions (B), (C) and (D) were prepared. $\Delta\epsilon$ and Vth of these liquid crystal compositions are given in Table 1.

Table 1

| Liquid crystal composition | o-terphenyl | $\Delta\epsilon$ | Vth (V) |
|---|---|---|---|
| (B) 100 parts by weight | 2 parts by weight | 2.5 | 3.0 |
| (C) " | 5 " | 2.5 | 2.8 |
| (D) " | 8 " | 2.5 | 2.1 |

As apparent from Table 1, Vth of liquid crystal composition (D) was made 36% lower than Vth of liquid crystal composition (A).

EXAMPLE 2

A liquid crystal composition (E) consisting of 100 parts by weight of the liquid crystal composition (A) and 8 parts by weight of m-terphenyl had a Vth of 2.3 V.

EXAMPLES 3 - 6

8 parts by weight of o-terphenyl or m-terphenyl were or were not added to 100 parts by weight of the liquid compositions as shown in Table 2, and their Vth was measured. The results are shown in Table 2.

Table 2

| Ex. No. | Liquid crystal composition | Parts by weight | Terphenyl (8 parts by weight) | Vth |
|---|---|---|---|---|
| 3 | Liquid crystal composition (A) | (100) } 100 | m-terphenyl | 2.2 |
| | n-butylbenzylidene-p-nitroaniline | (10) | — | 3.0 |

Table 2-continued

| Ex. No. | Liquid crystal composition | | Parts by weight | | Terphenyl (8 parts by weight) | Vth |
|---|---|---|---|---|---|---|
| 4 | Liquid crystal composition (A) [100] 4,4'-bis(hexyloxy)-azoxybenzene [10] | | (100) | 100 | m-terphenyl | 2.1 |
| | p-ethoxybenzylidene-p'-cyanoaniline | | (8) | | — | 3.0 |
| 5 | Liquid crystal composition (A) | | (100) | 100 | o-terphenyl | 3.2 |
| | p-N,N-dimethylcyanoaniline | | (10) | | — | 4.0 |
| 6 | p-n-heptyl-p'-cyanobiphenyl | 45% by mole | | 100 | o-terphenyl | 1.2 |
| | p-n-amyloxy-p'-cyanobiphenyl | 20% by mole | | | | |
| | p-n-heptyloxy-p'-cyanobiphenyl | 15% by mole | | | | |
| | p-n-octyloxy-p'-cyanobiphenyl | 20% by mole | | | — | 1.7 |

Note: Figure in parentheses ( ) and [ ] is parts by weight

EXAMPLE 7

Relations between the amount of terphenyl added to said liquid crystal composition (A) and Vth of the resulting liquid crystal compositions were investigated. The results are shown in the accompanying drawing, where Vth is made lower with increasing amount of o-terphenyl (1) or m-terphenyl (2) added, but Vth is hardly changed with increasing amount of p-terphenyl (3) added.

Furthermore, relations between the amount of terphenyl added to said liquid crystal composition (A) and upper limit temperature (° C) of MR were investigated, and the results are shown in Table 3. When the upper limit temperature of MR is below 30° C, the applicable range as a display device is restricted.

Table 3

| Amount of terphenyl added (parts by weight) | Upper limit temperature of MR (° C) o-terphenyl | m-terphenyl |
|---|---|---|
| 0 | 58 | 58 |
| 2 | 49 | 51 |
| 5 | 44 | 44 |
| 8 | 36 | 34 |
| 10 | 32 | 30 |

EXAMPLE 8

A liquid crystal composition (F) consisting of 100 parts by weight of said liquid composition (A) and 8 parts by weight of a 1 : 1 mixture of o-terphenyl and m-terphenyl had a Vth of 2.4 V.

By adding o-terphenyl or m-terphenyl or both to the liquid crystal composition, Vth of nematic liquid crystal compositions of various types so far used in the TN type display can be considerably lowered, as described above.

The nematic liquid crystal compositions containing at least one of o-terphenyl and m-terphenyl and having a substantially positive dielectric anisotropy can be used in other display systems than that of TN type display, for example, in a phase transition type display device by adding a cholesteric liquid crystal or optical active substance, and further two-color pigment to the present nematic liquid composition.

What is claimed is:

1. A liquid crystal composition for field effect display devices, which comprises a nematic liquid crystal composition having a positive dielectric anisotropy and at least one of o-terphenyl and m-terphenyl.

2. A liquid crystal composition for field effect display devices, which comprises 100 parts by weight of a nematic liquid crystal composition having a positive dielectric anisotropy and 2 to 10 parts by weight of at least one of o-terphenyl and m-terphenyl.

3. A liquid crystal composition according to claim 2, wherein said nematic liquid crystal composition comprises a mixture consisting essentially of approximately 91% by weight of equal parts by weight of p-methoxybenzylidene-p'-butylaniline, p-ethoxy-benzylidene-p'-butylaniline, and p-ethoxybenzylidene-p'-heptylaniline and 9% by weight of p-nitrobenzylidene-aminobenzene.

4. A liquid crystal composition according to claim 3, wherein said nematic liquid crystal composition comprises an admixture of approximately 91% by weight of said mixture and 9% by weight of n-butylbenzylidene-p-nitroanailine.

5. A liquid crystal composition according to claim 3, wherein said nematic liquid crystal composition comprises an admixture of approximately 84% by weight of said mixture, 8% by weight of 4,4'-bis(hexylazoxy)-azoxybenzene and 8% by weight of p-ethoxybenzylidene-p'-cyanoaniline.

6. A liquid crystal composition according to claim 3, wherein said nematic liquid crystal composition comprises an admixture of 91% by weight of said mixture and 9% by weight of p-N,N-dimethylcyanoaniline.

7. The liquid crystal composition according to claim 2, wherein said nematic liquid crystal composition contains 45 Mol. % of p-n-heptyl-p'-cyanobiphenyl, 20 Mol. % of p-n-amyloxy-p'-cyanobiphenyl, 15 Mol. % of p-n-heptyloxy-p'-cyanobiphenyl and 20 Mol. % of p-n-octyloxy-p'-cyanobiphenyl.

* * * * *